(12) United States Patent
Furuya

(10) Patent No.: US 7,113,309 B2
(45) Date of Patent: Sep. 26, 2006

(54) IMAGE PROCESSING METHOD, IMAGE PROCESSING APPARATUS, AND IMAGE PROCESSING SYSTEM

(75) Inventor: Tomoyuki Furuya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 997 days.

(21) Appl. No.: 10/098,546

(22) Filed: Mar. 18, 2002

(65) Prior Publication Data

US 2002/0191202 A1      Dec. 19, 2002

(30) Foreign Application Priority Data

Apr. 2, 2001 (JP) .............................. 2001/103640

(51) Int. Cl.
*G06F 15/00* (2006.01)
(52) U.S. Cl. ...................... 358/1.9; 358/1.15; 358/518; 345/629
(58) Field of Classification Search ................. 358/1.9, 358/1.15, 518; 345/629
See application file for complete search history.

(56) References Cited

U.S. PATENT DOCUMENTS

| | | | | |
|---|---|---|---|---|
| 6,228,125 | B1 * | 5/2001 | Kuriyama | 382/304 |
| 6,853,465 | B1 * | 2/2005 | Ohnishi | 358/1.9 |
| 2002/0191202 | A1 * | 12/2002 | Furuya | 358/1.9 |

* cited by examiner

*Primary Examiner*—David Moore
*Assistant Examiner*—Michael Burleson
(74) *Attorney, Agent, or Firm*—Fitzpatrick, Cella, Harper & Scinto

(57) ABSTRACT

An information processing method is provided in which bit-map data and attribute information for each pixel corresponding to the bit-map data are created by expanding a rendering command. In this method, the type of operation to be performed on the attribute information is determined based on logical operation processing specified for the rendering command. The logical operation processing for attribute information is created based on the determined type of operation. The attribute information is created by executing the logical operation processing. The attribute information is inverted if it possesses an inversion attribute.

15 Claims, 15 Drawing Sheets

OPERATION 1 : STORE ATTRIBUTE INFORMATION

OPERATION 2 : CLEAR

OPERATION 3 : MAINTAINED

OPERATION 4 : INVERT

| PATTERN | SOURCE | DEST | RESULT | SOURCE COPY | PATTERN COPY |
|---|---|---|---|---|---|
| 0 | 0 | 0 | r000(0 or 1) | 0 | 0 |
| 0 | 0 | 1 | r001(0 or 1) | 0 | 0 |
| 0 | 1 | 0 | r010(0 or 1) | 1 | 0 |
| 0 | 1 | 1 | r011(0 or 1) | 1 | 0 |
| 1 | 0 | 0 | r100(0 or 1) | 0 | 1 |
| 1 | 0 | 1 | r101(0 or 1) | 0 | 1 |
| 1 | 1 | 0 | r110(0 or 1) | 1 | 1 |
| 1 | 1 | 1 | r111(0 or 1) | 1 | 1 |

FIG. 7A

| SOURCE | DEST | RESULT |
|--------|------|--------|
| 0 | 0 | r000 |
| 0 | 1 | r001 |
| 1 | 0 | r010 |
| 1 | 1 | r011 |

FIG. 7B

| SOURCE | RESULT | | BIT OPERATION ON TARGET ATTRIBUTE |
|--------|--------|---|-----------------------------------|
| 0 | r000 | ⎫ | |
| 0 | r001 | ⎬ → | Target_SrcON |
| 1 | r010 | ⎫ | |
| 1 | r011 | ⎬ → | Target_SrcOFF |

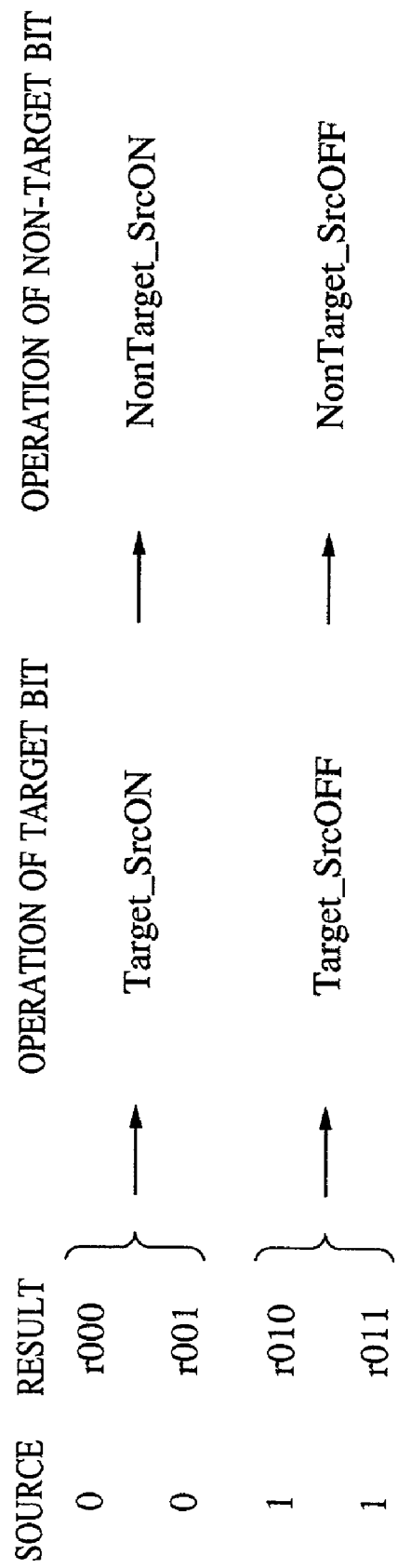

FIG. 8A

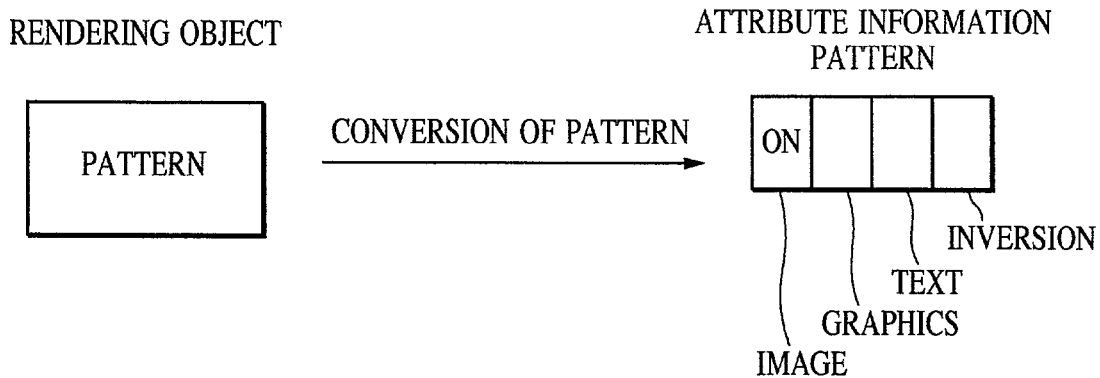

RENDERING OBJECT → CONVERSION OF PATTERN → ATTRIBUTE INFORMATION PATTERN (ON / / / ) — IMAGE, GRAPHICS, TEXT, INVERSION

FIG. 8B

| ATTRIBUTE INFORMATION PATTERN | ATTRIBUTE INFORMATION SOURCE | ATTRIBUTE-INFORMATION STORAGE AREA | RESULT | |
|---|---|---|---|---|
| OFF | OFF | OFF | OFF or ON | NonTarget_SrcOFF |
| OFF | OFF | ON | OFF or ON | |
| OFF | ON | OFF | OFF or ON | NonTarget_SrcON |
| OFF | ON | ON | OFF or ON | |
| ON | OFF | OFF | OFF or ON | Target_SrcOFF |
| ON | OFF | ON | OFF or ON | |
| ON | ON | OFF | OFF or ON | Target_SrcON |
| ON | ON | ON | OFF or ON | |

IMAGE PROCESSING METHOD, IMAGE PROCESSING APPARATUS, AND IMAGE PROCESSING SYSTEM

BACKGROUND OF THE INVENTION

1. Field of the Invention

The present invention relates to an image processing method, an image processing apparatus, and an image processing system.

2. Description of the Related Art

Generally, in image output devices, such as laser beam printers, which output high quality images, a device-dependent bit-map is created as follows. Upon receiving a rendering command from an operating system (OS), a multi-level bit map having total of 24 bits for red (R), green (G), and blue (B) is expanded in a multi-level bit-map area. Then, when the processing of all the rendering commands is completed, color processing (color correction, color conversion, n-level processing, etc.) is performed on the entire multi-level bit-map area, thereby forming a device-dependent bit map in a color space.

However, the expanded multi-level bit map does not possess attribute information for each pixel, and a determination as to for which type of object (character, graphics, or image) a certain pixel is used cannot be made, or it cannot be determined whether such a pixel forms an edge portion or a central portion of the object. Accordingly, all the pixels unconditionally undergo substantially the same color processing, and such processing is not always optimal for the individual pixels. The concept of such color processing is shown in FIG. 12.

Accordingly, techniques for providing attribute information for all the pixels in order to achieve optimal color processing on each pixel are known.

For example, the simplest technique is to reserve extra eight bits for providing attribute information per pixel which consists of 24 RGB bits, and one pixel is represented by RGBα having a total of 32 bits.

Another technique is to reserve memory for storing attribute information in a different area while maintaining one pixel as 24 RGB bits. The concept of color processing using such an attribute-information memory is shown in FIG. 13. In this technique, the attribute-information storage area is updated every time the corresponding pixel in the multi-level bit-map area is updated.

Accordingly, when a multi-level bit map is expanded into a multi-level bit-map area in response to a rendering command, attribute information is provided for all the pixels. Then, optimal color processing can be performed while considering the attribute information for each pixel.

According to the above-described techniques for providing attribute information, optimal color processing can be performed without presenting any problem as long as new rendering objects simply overwrite old rendering objects. However, when a rendering object which requires a logical operation is processed, attribute information cannot be precisely stored.

This problem is explained in more detail below with reference to FIG. 14. FIG. 14 illustrates an image object and a graphics object being overlapped when they are expanded into a bit map. Concerning the graphics object, a logical operation, i.e., "rendering is performed only when the graphics object does not have an underlayer" is designated for graphics-image attribute information 102. In this case, in a device-dependent bit-map area 200 in which a bit map is expanded, optimal color processing for images must be performed on the overlapping portion of the image object and the graphics object.

According to the above-described known attribute-information storage technique, however, after image-object attribute information 101 is stored, the graphics-object attribute information 102 may overwrite the image-object attribute information 101, as indicated in an attribute-information storage area 100 in FIG. 14. Then, when performing color processing, pixels which actually possess an image attribute, are erroneously determined to possess the graphics attribute, thereby failing to perform optimal rendering processing.

SUMMARY OF THE INVENTION

Accordingly, in order to solve the above-described problems, it is an object of the present invention to provide an image processing method, an image processing apparatus, and an image processing system in which high quality images can be obtained by performing optimal processing for attributes for the individual pixels even when a rendering operation which requires a logical operation is performed.

In order to achieve the above object, according to one aspect of the present invention, there is provided an image processing method for creating bit-map data and attribute information for each pixel corresponding to the bit-map data by expanding a rendering command. The image processing method includes: an operation determining step of determining the type of operation to be performed on the attribute information based on logical operation processing specified for the rendering command; a logical operation processing creating step of creating the logical operation processing for the attribute information based on the determined type of operation; a logical operation processing step of creating the attribute information by executing the logical operation processing; and an inversion step of inverting the attribute information when the attribute information possesses an inversion attribute.

According to another aspect of the present invention, there is provided an image processing apparatus for creating bit-map data and attribute information for each pixel corresponding to the bit-map data by expanding a rendering command. The image processing apparatus includes an operation determining unit for determining the type of operation to be performed on the attribute information based on logical operation processing specified for the rendering command. A logical operation processing creating unit creates the logical operation processing for the attribute information based on the determined type of operation. A logical operation processor creates the attribute information by executing the logical operation processing. An inversion unit inverts the attribute information when the attribute information possesses an inversion attribute. A color processor performs color processing on the bit-map data based on the attribute information.

According to still another aspect of the present invention, there is provided an image processing system including an image processing apparatus and an image forming apparatus connected to each other. The image processing apparatus includes: a bit-map creating unit for creating bit-map data by expanding a rendering command; an attribute-information creating unit for creating attribute information for each pixel corresponding to the bit-map data; a color processor for performing color processing on the bit-map data based on the attribute information; and output unit for outputting the color-processed bit-map data to the image forming apparatus. The attribute-information creating unit includes: an operation determining unit for determining the type of operation to be performed on the attribute information based on logical operation processing specified for the rendering command; a logical operation processing creating unit for creating the logical operation processing for the attribute information based on the determined type of operation; a logical operation processor for creating the attribute information by executing the logical operation processing; and an inversion unit for inverting the attribute information when the attribute information possesses an inversion attribute.

According to a further aspect of the present invention, there is provided a control program for performing image processing for creating bit-map data and attribute information for each pixel corresponding to the bit-map data by expanding a rendering command. The control program includes: an operation determining step code for determining the type of operation to be performed on the attribute information based on logical operation processing specified for the rendering command; a logical operation processing creating step code for creating the logical operation processing for the attribute information based on the determined type of operation; a logical operation processing step code for creating the attribute information by executing the logical operation processing; and an inversion step code for inverting the attribute information when the attribute information possesses an inversion attribute.

According to the present invention, a recording medium storing the above-described control program is also provided.

BRIEF DESCRIPTION OF THE DRAWINGS

FIG. 7A illustrates examples of operation results when the bit patterns indicate a color other than white.

FIG. 7B illustrates a method for determining the type of operation to be performed on target attribute bits.

FIG. 7D is a method for determining the type of operation to be performed on non-target attribute bits.

FIG. 8A illustrates a method for creating the attribute information pattern.

FIG. 8B illustrates examples of attribute-information logical operation code.

DESCRIPTION OF THE PREFERRED EMBODIMENTS

Figure 1:
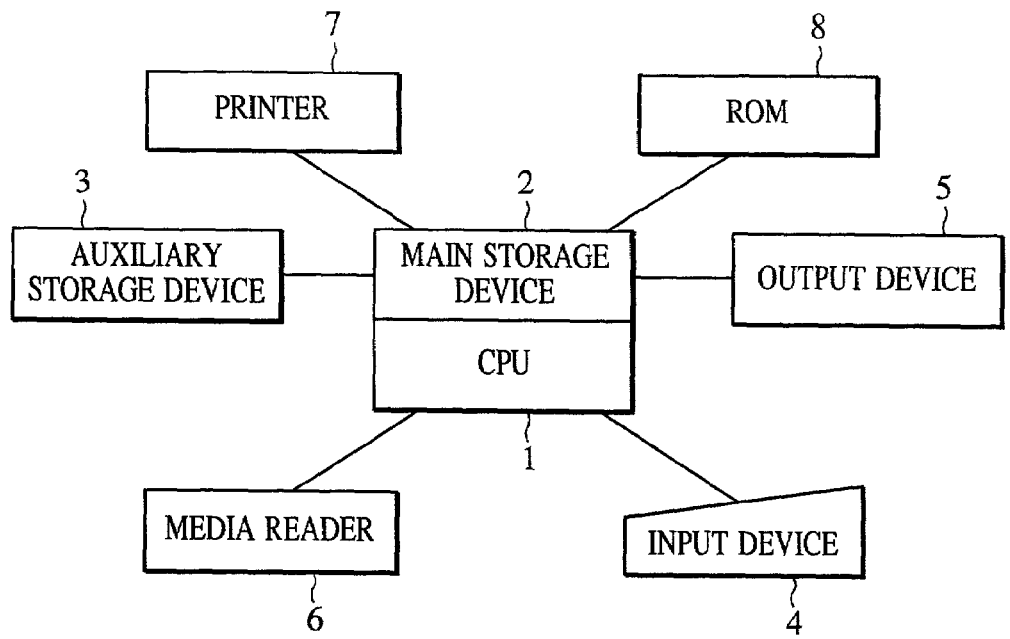
FIG. 1 is a block diagram illustrating the configuration of an information processing system according to an embodiment of the present invention.
Figure 2:
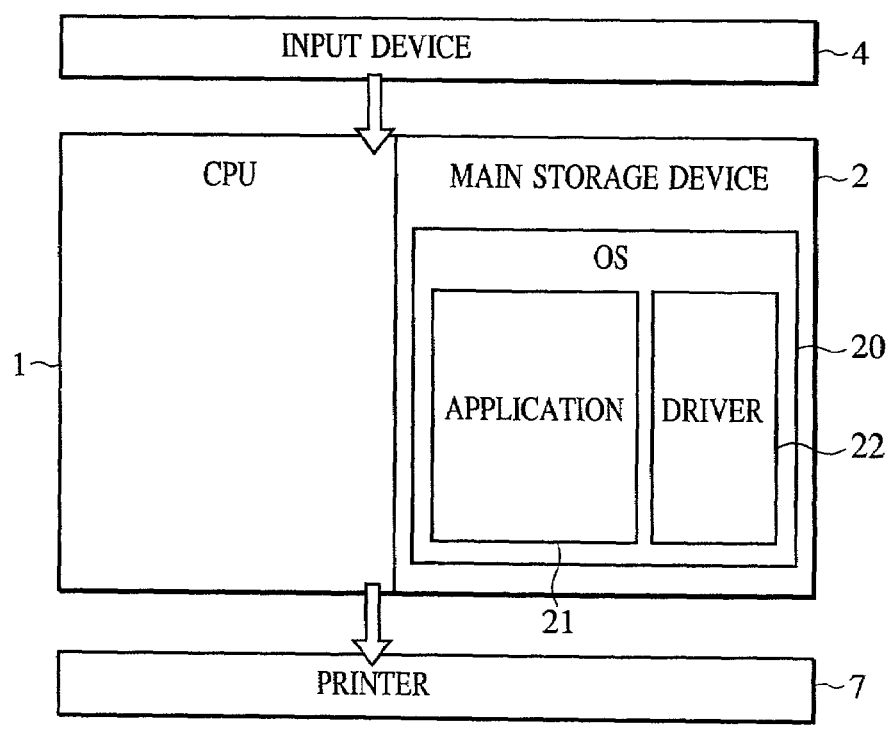
FIG. 2 illustrates the concept of printing processing performed in the information processing system shown in FIG. 1.
Figure 3:
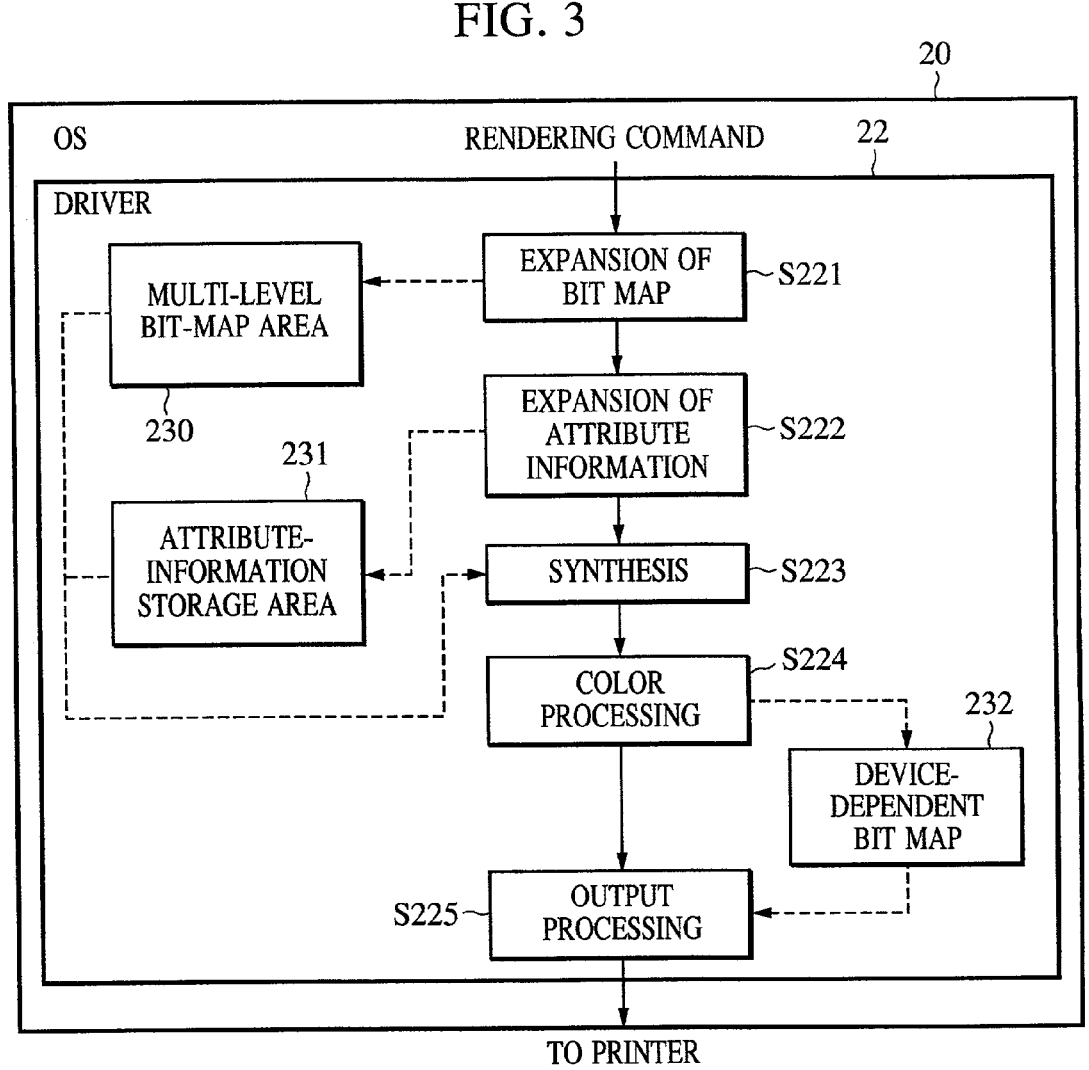
FIG. 3 is a block diagram illustrating the functional configuration of a driver used in the information processing system shown in FIG. 1.

FIGS. 1, 2, and 3 are block diagrams illustrating the configuration of an information processing system employing an information processing method of an embodiment of the present invention.

In FIG. 1, a central processing unit (CPU) 1 reads a control program implementing the image processing method of this embodiment and corresponding related data stored in a storage medium, such as a floppy disk (FD), a compact disc read only memory (CD-ROM), or an integrated circuit (IC) memory card, by using a media reader 6 connected to the image processing system. Then, based on the control program, the CPU 1 processes image information input through an input device 4 via a system program or an application program loaded from an auxiliary storage device 3 into a main storage device 2, and then outputs the processed image information to an output device 5 or a printer 7. The image information may be stored in a storage medium read by the auxiliary storage device 3 or the media reader 6.

In this embodiment, the output device 5 is formed of a display device or a communication interface device, and is thus different from the printer 7. The input device 4 is formed of a keyboard, a pointing device, etc. The auxiliary storage device 3 is a single device, such as a hard disk drive or a magneto-optical disk drive, or may be a combination of such drives. The above-described devices may be connected to each other via a network.

FIG. 2 illustrates the concept of printing processing from when the control program and the related data are read by the CPU 1 through the media reader 6 until when printing data is sent to the printer 7 based on a printing command input via the input device 4. The printing processing functions under the control of an OS 20 in combination with an application 21 and a driver 22.

FIG. 3 is a block diagram, together with a flowchart, illustrating the functional configuration of the driver 22 shown in FIG. 2. In step S221, a rendering command is received from the OS 20, and is expanded into a multi-level bit map, which is then stored in a multi-level bit-map area 230. Simultaneously, in step S222, attribute information indicating attributes of a rendering object is stored in an attribute-information storage area 231. The attribute information is information required for performing optimal color processing, for example, the type of object (image, graphics, or text) or edge information indicating the edge of the object.

FIG. 3 illustrates an example in which the multi-level bit map (24 RGB bits) and the attribute information (8 α bits)

are stored in the different areas. However, they may be stored together in a single bit map (32 RGBα bits), in which case, advantages similar to those achieved by storing the multi-level bit map and the attribute information separately can be obtained.

In step S223, upon completing the processing of all the rendering commands, the multi-level bit map is combined with the attribute information, and multi-level bit-map data is extracted according to the type of attribute. Then, in step S224, color processing suitable for each type of attribute is performed on the extracted bit-map data, and the individual items of the bit-map data are combined, thereby creating a device-dependent bit map 232. In step S225, the device-dependent bit map 232 is output to the printer 7.

In this embodiment, the expansion of rendering commands into a bit map and the color processing are performed in the driver 22 of the printer 7 in the information processing system. In the present invention, however, such processing may be performed in the printer 7.

Details of the processing of this embodiment in the information processing system are given below with reference to FIGS. 4 through 10.

Figure 4:
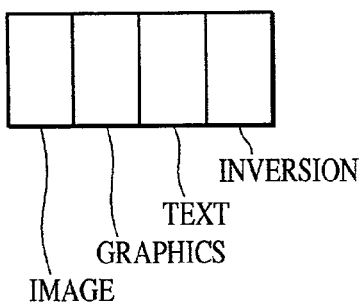
FIG. 4 illustrates an example of the format of attribute information used in the information processing system shown in FIG. 1.

FIG. 4 illustrates the format of attribute information stored in the attribute-information storage area 231 for each pixel of the multi-level bit map. In this embodiment, the attribute information indicates the type of object (a total of three types: image, graphics, and text), and attribute information for one pixel is formed of at least four bits including three bits representing the three types of objects and one bit representing an inversion attribute, which is described below. Alternatively, extra four bits may be added, resulting in eight bits per pixel (the extra four bits are not used). The attribute-information storage area 231 does not have to be arranged in the order of bits, and may be linearly ordered.

Figures 5, 6:
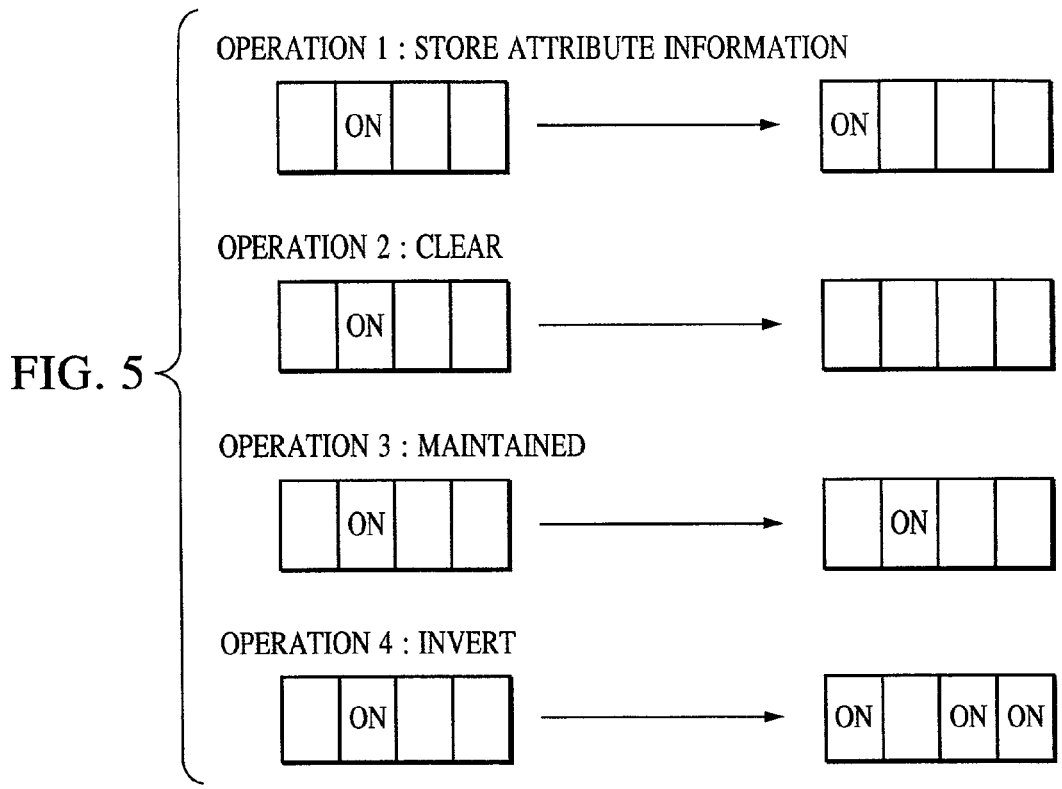
FIG. 5 illustrates the operations to be performed when storing the attribute information.
FIG. 6 illustrates general logical operation processing.

FIG. 5 illustrates the various operations to be performed when storing attribute information in processing a rendering object which requires a logical operation.

In this embodiment, one of the following four operations is performed so as to store the attribute information for any type of rendering object which requires a logical operation in the attribute-information storage area 231:

Operation 1: storing attribute information (setting the bit of a targeted attribute);
Operation 2: clear (clearing all the bits of the attribute information);
Operation 3: no change (maintaining all the bits of the attribute information); and
Operation 4: inversion (inverting all the bits of the attribute information).

FIG. 5 illustrates specific examples of the individual operations performed on the attribute information in which the bit indicating the graphics attribute is already set when the pixel to be processed forms an underlayer. In operation 1, a new image attribute is stored. In FIG. 5, "ON" indicates that a corresponding bit is set. According to operation 1, by storing the image attribute in the attribute-information storage area 231, the graphics attribute, which forms an underlayer, is cleared.

A description is given below, with reference to FIGS. 6, 7, and 8, of a method for determining which of the four types of operations is to be used when storing attribute information in processing a rendering object which requires a logical operation.

For simplifying the description, an overview of logical operation processing is discussed below with reference to FIG. 6. Generally, a logical operation indicates an operation result based on the bits indicating the pattern, the source, and the destination (hereinafter simply referred to as "dest")), and the operation result (hereinafter simply referred to as the "result")) is stored in the dest.

The result rxxx (each x indicates the value of the pattern, the source, or the dest (0 or 1)) is 0 or 1 according to the types of combinations (eight) of the pattern, the source, and the dest. That is, in this case, a total of 256 ($2^8$) types of logical operations are possible. The logical operation code uniquely determines the type of logical operation. The eight patterns of the results shown in FIG. 6, i.e., r000, r001, r010, r011, r100, r101, r110, r111, are arranged from the lower bit to the upper bit, resulting in the logical operation code. In the example shown in FIG. 6, the source copy is 11001100 (=0xCC), and the pattern copy is 11110000 (=0xF0).

In the logical operation, according to the source copy (overwriting of the source on the dest), the bits represented by the source are directly reflected as the result (dest) regardless of the combination of the pattern and the dest. According to the pattern copy (overwriting the pattern on the dest), the bits represented by the pattern are directly reflected as the result (dest).

FIGS. 7A through 7D illustrate examples in which the type of operation to be performed on attribute information (hereinafter sometimes simply referred to as the "attribute information operation")) is determined based on logical operation processing (logical operation code) specified for a rendering object in this embodiment.

As discussed above, the logical operation processing is specified by a logical operation code. Any logical operation code may be used as long as it uniquely determines the result, as shown in FIG. 6. In this example, a logical operation code provided by Windows (Microsoft Corporation) is used. In this code, 0 indicates that the bit is on (ON), and 1 indicates that the bit is off (OFF).

The operation executed on the bit of the corresponding attribute, which should be turned on if a logical operation is not specified for the attribute information, is described below with reference to FIGS. 7A and 7B.

If the pattern accompanying the rendering object indicates white, the result r1xx shown in FIG. 6 is the bit used for determining the operation performed on the attribute information. In contrast, if the pattern value indicates a color other than white, the result r0xx is the bit to be used. This is because the pattern corresponding to white (0xFFFFFFFF in the RGB value) does not exist in the logical operation processing. FIG. 7A illustrates the result r0xx when the pattern is a color other than white. The result r0xx is equal to the pattern value 0 in the general logical operation processing shown in FIG. 6.

FIG. 7B illustrates an example in which the attribute information operation is determined based on the result r0xx shown in FIG. 7A. A description is given below of a method for determining the operation based on the result rxxx including both the results r0xx and r1xx.

A combination of rx00 and rx01 and a combination of rx10 and rx11 are checked. That is, there are four combinations to be taken by (rx00, rx01) and (rx10, rx11), i.e., (0,0), (0,1), (1,0), and (1,1). These four combinations are assigned to the four operations shown in FIG. 5 as follows:

(0,0)→bit is ON→operation 1 (store attribute information);

(1,1)→bit is OFF→operation 2 (clear);

(0,1)→bit is the same as dest→operation 3 (maintained (no change)); and (1,0)→bit is inverted from the dest operation 4 (inversion). One of the above operations is uniquely determined when the source bit is 0 (rx00, rx01) and when the source bit is 1 (rx10, rx11).

More specifically, in the example shown in FIG. 7B, when the source bit is 0 (ON), Target_SrcON is obtained as the bit operation performed on the target attribute (attribute information operation). When the source bit is 1 (OFF), Target_SrcOFF is obtained in a manner similar to Target_SrcON. Target_SrcON or the Target SrcOFF results in any one of the above-described four combinations (0,0), (0,1), (1,0), and (1,1), thereby determining the operation to be performed.

When logical operation processing is not specified for a rendering command, the operation is determined assuming that a logical operation code indicating simple overwrite processing is specified.

Figure 7C:
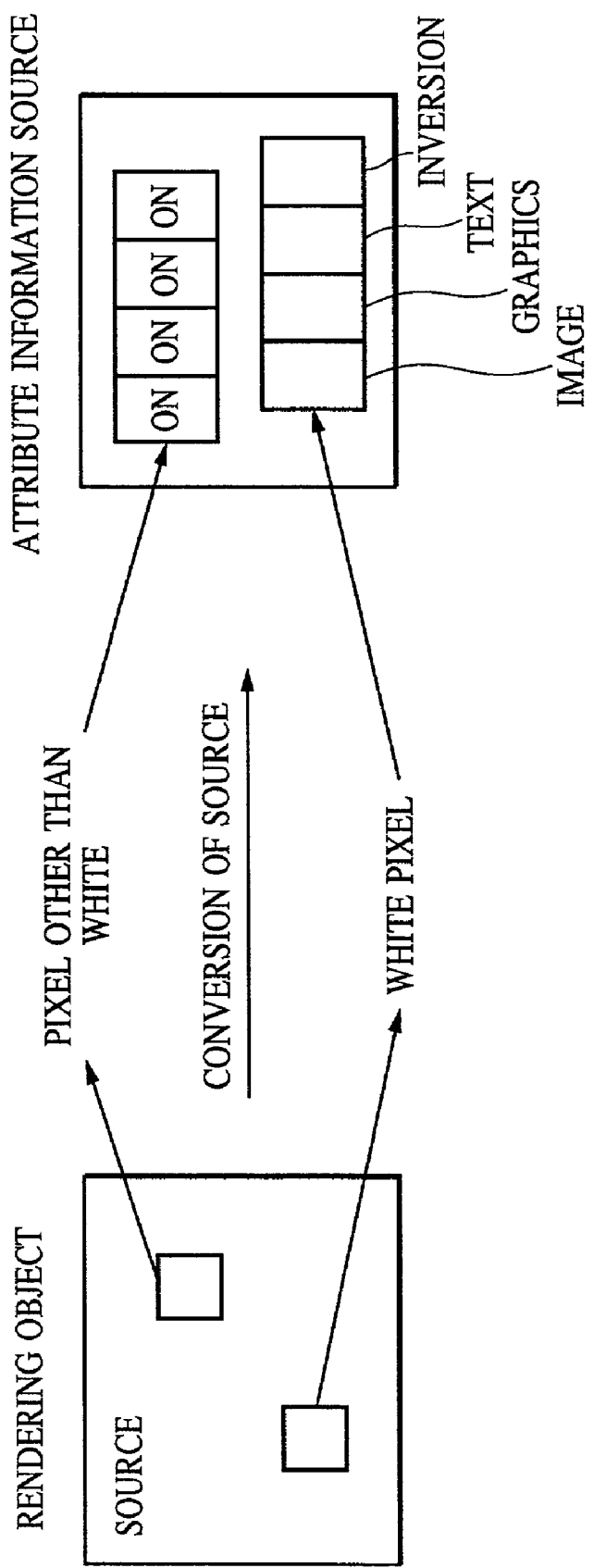
FIG. 7C illustrates a method for creating the attribute information source.

However, in order to execute the attribute information operation determined as described above, it is necessary to convert the rendering object source into the attribute information source. More specifically, concerning pixels of the rendering object provided with the source, if the pixel patterns indicate white, all the attributes of the corresponding attribute information source are turned OFF (1 in Windows). Conversely, if the pixel patterns indicate a color other than white, all the attributes of the attribute information source are turned ON (0 in Windows). The above-described conversion of the source is shown in FIG. 7C.

The above-described attribute information operation is performed for the bits of the target attributes (target attribute bits). The operations for the bits of the non-target attributes are uniquely determined as follows according to the determined operations of the target attribute bits.

| Target attribute bits | Non-target attribute bits |
| --- | --- |
| Operation 1 (store attribute information) | Operation 2 (clear) |
| Operation 2 (clear) | Operation 2 (clear) |
| Operation 3 (maintained) | Operation 3 (maintained) |
| Operation 4 (inversion) | Operation 4 (inversion) |

FIG. 7D illustrates an example in which the operations for non-target attribute bits are determined. As in FIG. 7B, when the source bit is 0 (ON), Target_SrcON is obtained as the target-attribute bit operation, and when the source bit is 1 (OFF), Target_SrcOFF is obtained. Then, according to whether the target attribute bit operation is Target_SrcON or Target_SrcOFF, the non-target attribute bit operation NonTarget_SrcON/NonTarget_SrcOFF is determined as one of the operations 2 through 4, but not operation 1.

Figure 9:
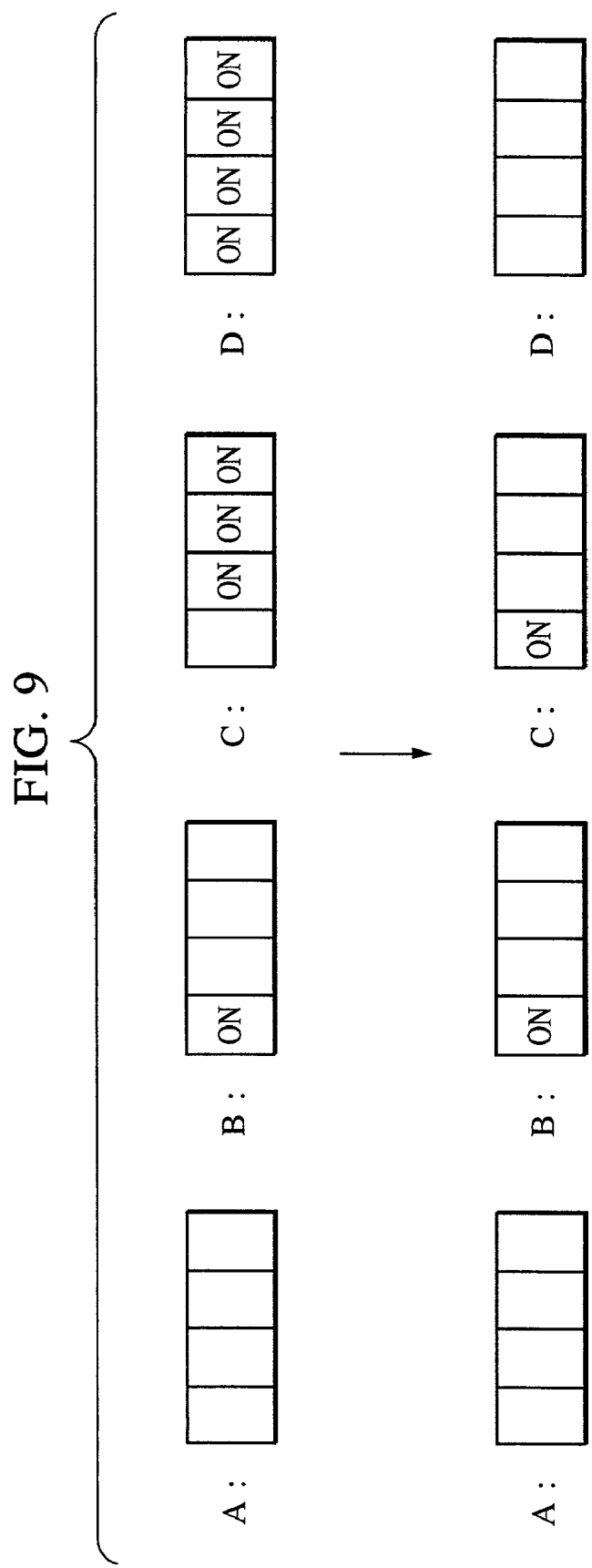
FIG. 9 illustrates inversion processing on the attribute information.

Concerning a rendering object which requires logical operation processing, the above-described operation (one of the operations 1 through 4) is performed on the attribute information source for each attribute, and inversion processing shown in FIG. 9 is further performed, thereby obtaining precise attribute information.

In this embodiment, logical operation processing is created based on the corresponding one of the operations 1 through 4 for the attribute information rather than simply executing the operations 1 through 4, which makes the execution of the operation more efficient. That is, when logical operation processing based on one of the above-described operations 1 through 4 is performed, the same results obtained when the operations determined for the target attribute bits and the non-target attribute bits are performed for the attribute information source can be obtained.

Logical operation processing for the attribute information in this embodiment is discussed below more specifically with reference to FIGS. 8A through 8C.

When performing the operation on the attribute information, it is necessary to switch among the operations 1 through 4 according to the attribute information for each pixel, according to the attribute bit, or according to the attribute information source. In this embodiment, for efficiently performing this switching operation, the individual operations for the attribute information are represented in a format similar to the general logical operation shown in FIG. 6, i.e., a format using the attribute information pattern and the attribute information source. To implement such efficient processing, the attribute information pattern shown in FIG. 8A should be prepared first. In the attribute information pattern shown in FIG. 8A, the bit indicating the attribute of a certain rendering object (in this example, the image attribute) is turned ON, and the other bits are turned OFF.

Figure 8C:
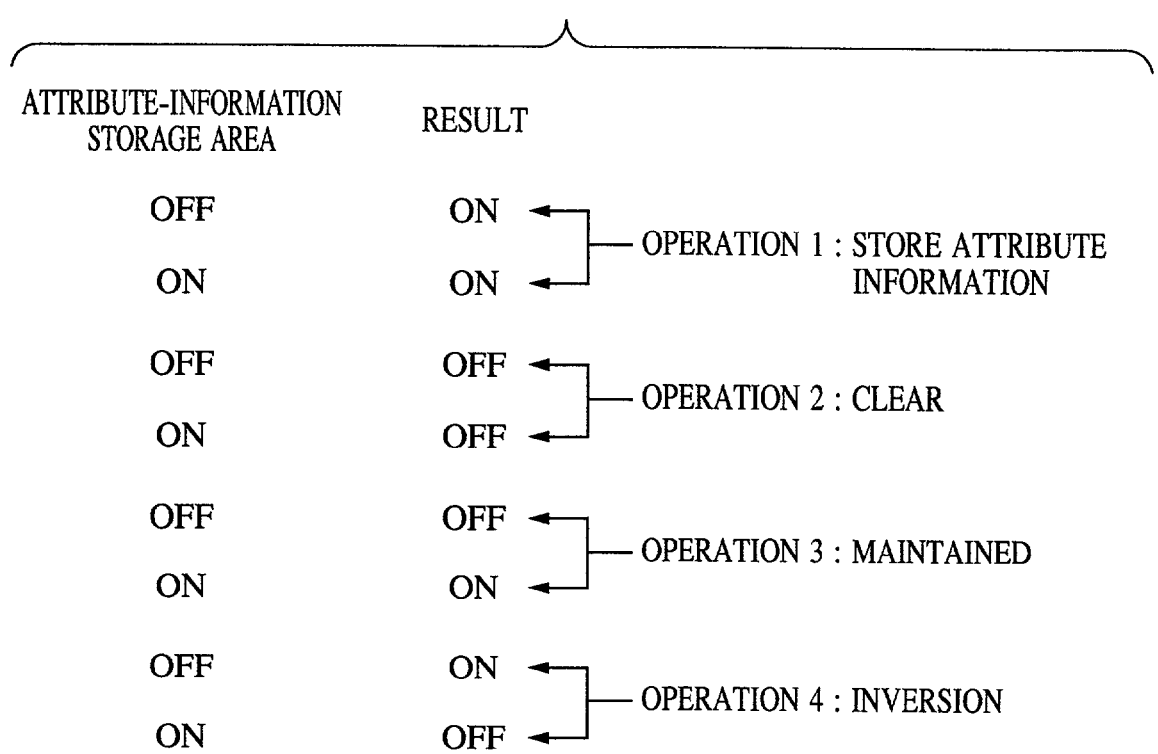
FIG. 8C illustrates a method for assigning the operations to the attribute-information logical operation code.

FIG. 8B illustrates an example of a combination of the attribute information pattern shown in FIG. 8A, the attribute information source shown in FIG. 7C, and the attribute information operation shown in FIG. 7D in the general format of the logical operation shown in FIG. 6. That is, FIG. 8B illustrates the logical operation code for the attribute information used in this embodiment. The result in FIG. 8B indicates the logical operation result, and the value (OFF or ON) corresponds to the result rxxxx (0 or 1). Thus, the result of the logical operation is uniquely determined as shown in FIG. 8C according to the target bit operation (Target_SrcON, Target_SrcOFF) shown in FIG. 7B and the non-target bit operation (NonTarget_SrcON, NonTarget_SrcOFF).

For example, if the attribute information pattern in FIG. 8B is OFF, the result in FIG. 8B is determined as shown in FIG. 8C based on the operation for the non-target attribute bit (NonTarget_SrcON, NonTarget_SrcOFF). That is, if the operation 2 (clear) is set for the non-target attribute bit, the result automatically is turned OFF to clear the bit regardless of the attribute-information storage area (dest). If the operation 3 (maintained) is set for the non-target attribute bit, the bit in the dest (OFF or ON) is maintained. If the operation 4 (inversion) is set, the result obtained by inverting the dest (ON or OFF) is used. If the attribute information pattern is OFF, operation 1 (store the attribute information) is not set for the non-target attribute bit, and thus, operation 1 need not be considered.

If the attribute information pattern is ON in FIG. 8B, the result shown in FIG. 8B is determined as shown in FIG. 8C based on the operation for the target attribute bit (Target_SrcOFF, Target_SrcON) shown in FIG. 7B in a manner similar to the case when the attribute information pattern is OFF. When the attribute information pattern is ON, however, the operation 1 can be set for the non-target attribute bit. If the operation 1 is set, the attribute information pattern is ON, and thus, the result is turned ON regardless of the dest (attribute-information storage area).

In this embodiment, by using the uniquely determined result shown in FIG. 8B as the attribute-information logical operation code, processing can be performed in a manner similar to the general logical operation processing. That is, the result OFF/ON shown in FIG. 8B is substituted with the result rxxx 0/1. Then, operation processing can be executed all at the same time without being aware of the target attribute bits of the attribute information.

The result obtained by performing the logical operation shown in FIG. 8B is stored in the attribute-information storage area 231 as the attribute information. The attribute information obtained by the logical operation is the same result as that obtained by performing the attribute information operation on each attribute information source.

Upon completing all the rendering objects, i.e., the logical operation processing for the accompanying attribute information, the bit inversion processing, which is one of the features of this embodiment, is performed. The bit inversion processing is described below with reference to FIG. 9.

When the processing for all the rendering objects is completed, the bit pattern indicated by the attribute information for each pixel stored in the attribute-information storage area 231 is one of the following four states A through D:

State A: all the bits are OFF (maintained as the initial value (nothing is rendered));
State B: only one attribute is ON (final operation is operation 1 (store attribute information));
State C: only one attribute is OFF (final operation is operation 4 (inversion) after state B));
State D: all the bits are ON (final operation is operation 4 (inversion) after state A)).

In the above-described bit patterns, only when the inversion bit is ON in state C or D, all four bits are inverted. In this case, exclusive-OR is performed between the inversion bits and the other attribute bits. Then, processing can be performed simultaneously regardless of the ON/OFF state of the inversion bit or the other attribute bits.

FIG. 9 illustrates states A through D of the bit patterns stored in the attribute-information storage area 231, and also shows the result obtained by performing inversion processing on the patterns in states C and D. As described above, by performing the above-described inversion processing on the bit patterns stored in the attribute-information storage area 231 after the processing for all the rendering objects is completed, ideal attribute information can be created.

Figure 10:
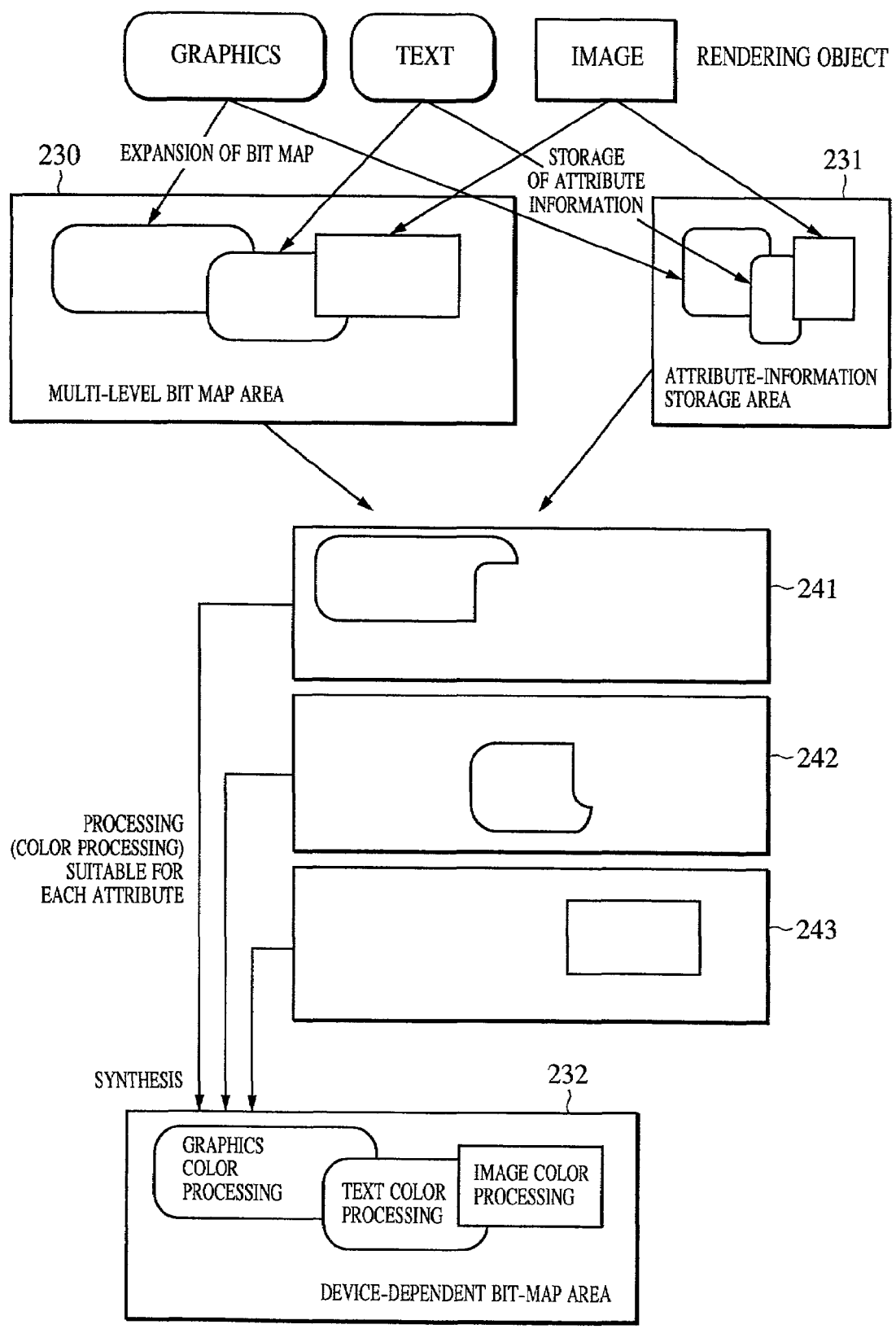
FIG. 10 schematically illustrates color processing performed by referring to the attribute information for multi-level bit maps.

FIG. 10 is a schematic diagram illustrating an overview of color processing (steps S223 and S224 in FIG. 3) performed for a multi-level bit map expanded into the multi-level bit map area 230 by referring to the attribute information created in the attribute-information storage area 231. In this embodiment, a multi-level bit map is extracted for each attribute (according to the type of object), as shown in FIG. 10, from the multi-level bit-map area 230 based on the attribute information stored in the attribute-information storage area 231. That is, a graphics multi-level bit map 241, a text multi-level bit map 242, and an image multi-level bit map 243 are extracted.

Then, color processing suitable for each attribute is performed on the extracted bit map, and the processed results are combined, thereby creating the device-dependent bit map 232. Alternatively, color processing may be performed for each pixel in the multi-level bit-map area 230 by referring to the attribute information rather than extracting the multi-level bit map for each attribute from the multi-level bit-map area 230.

Figure 11A:
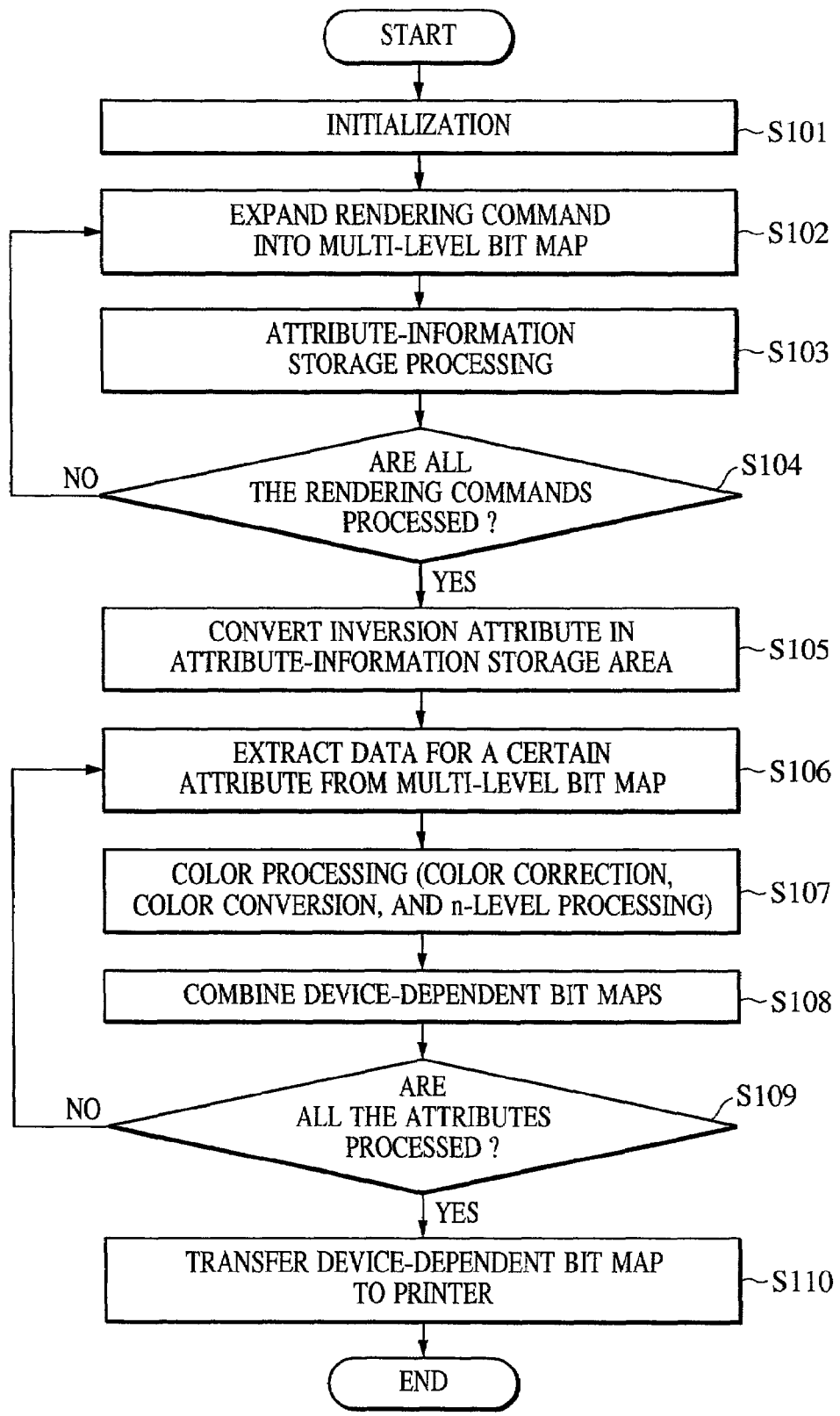
FIG. 11A is a flowchart illustrating the overall printing processing performed in the information processing system shown in FIG. 1.
Figure 11B:
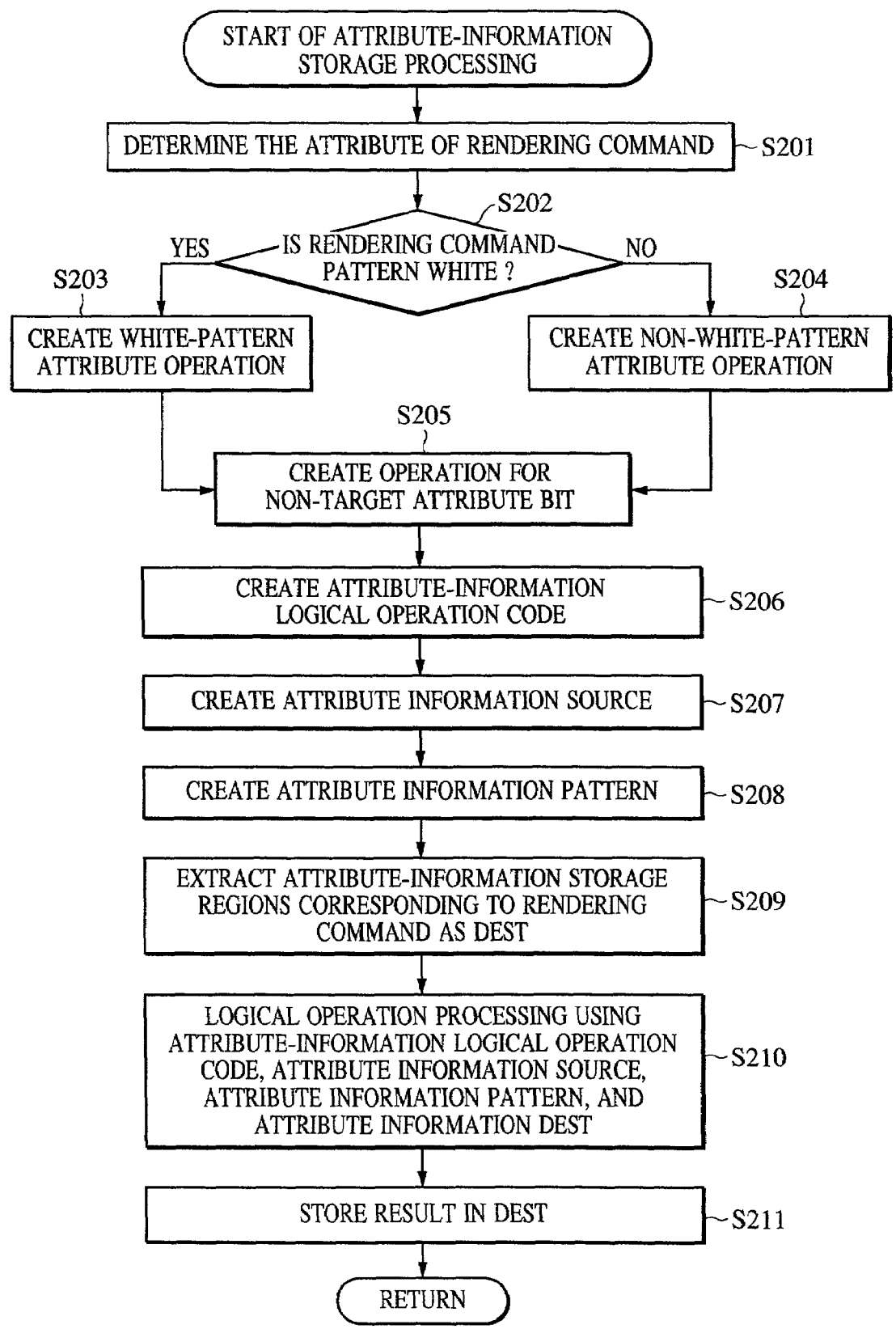
FIG. 11B is a flowchart illustrating details of attribute-information storage processing shown in FIG. 11A.
Figure 12:
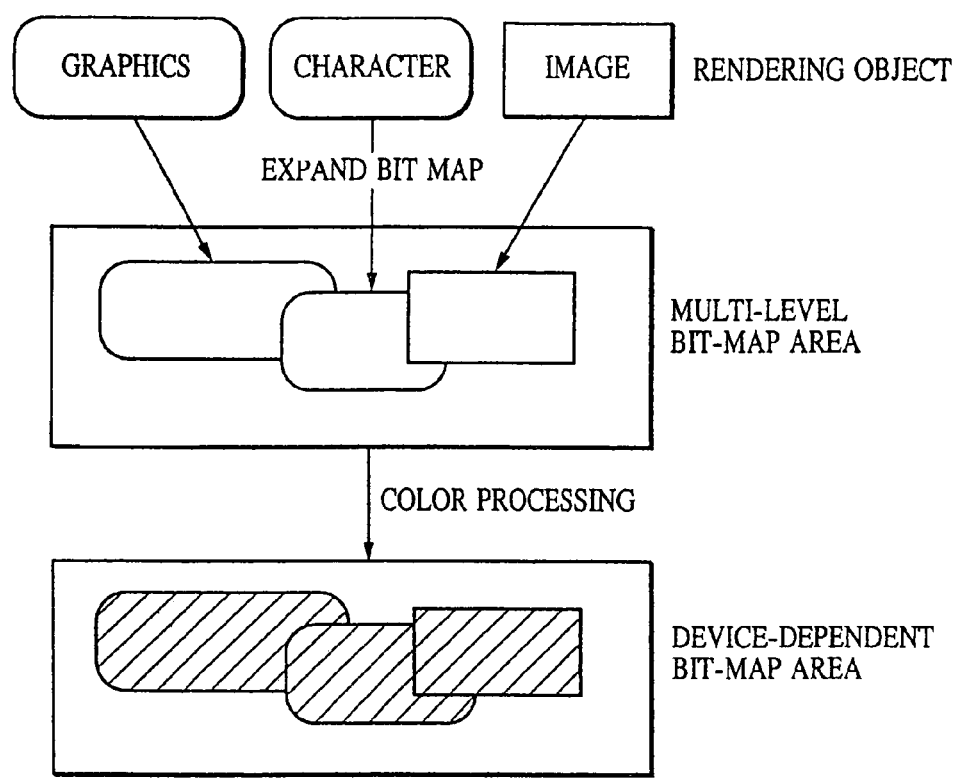
FIG. 12 illustrates the concept of the expansion of a multi-level bit map and the color processing for rendering objects using a known technique.
Figure 13:
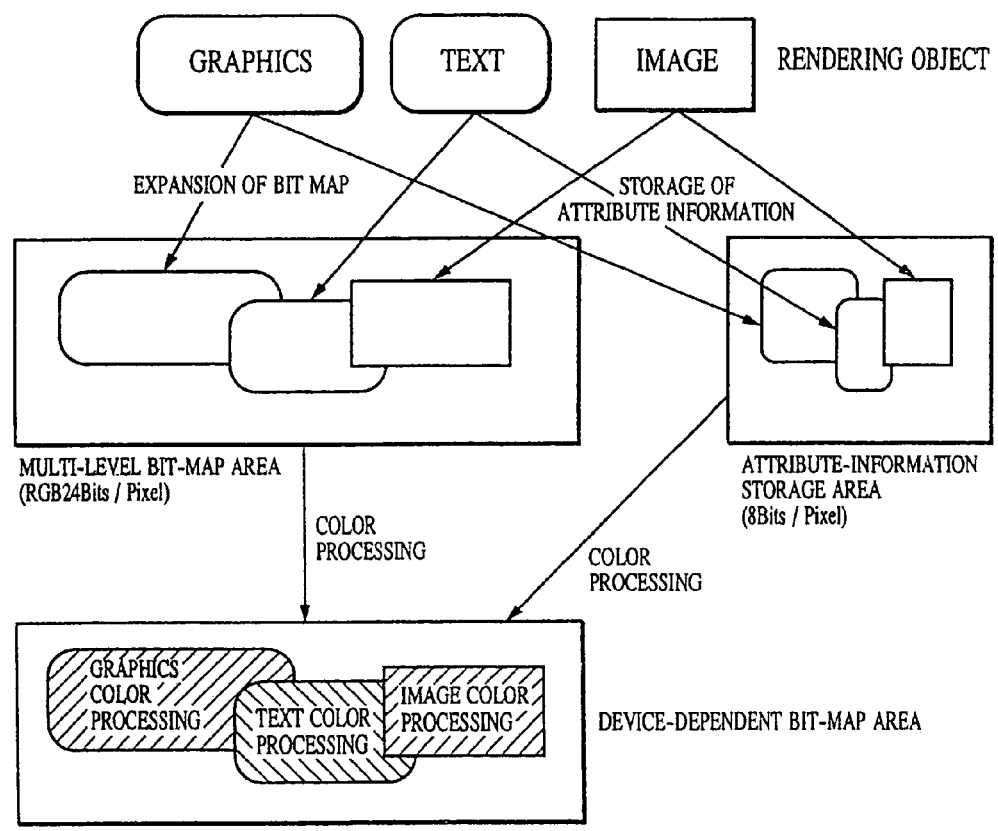
FIG. 13 illustrates the concept of color processing using an attribute information memory separately from a multi-level bit-map memory according to another known technique.
Figure 14:
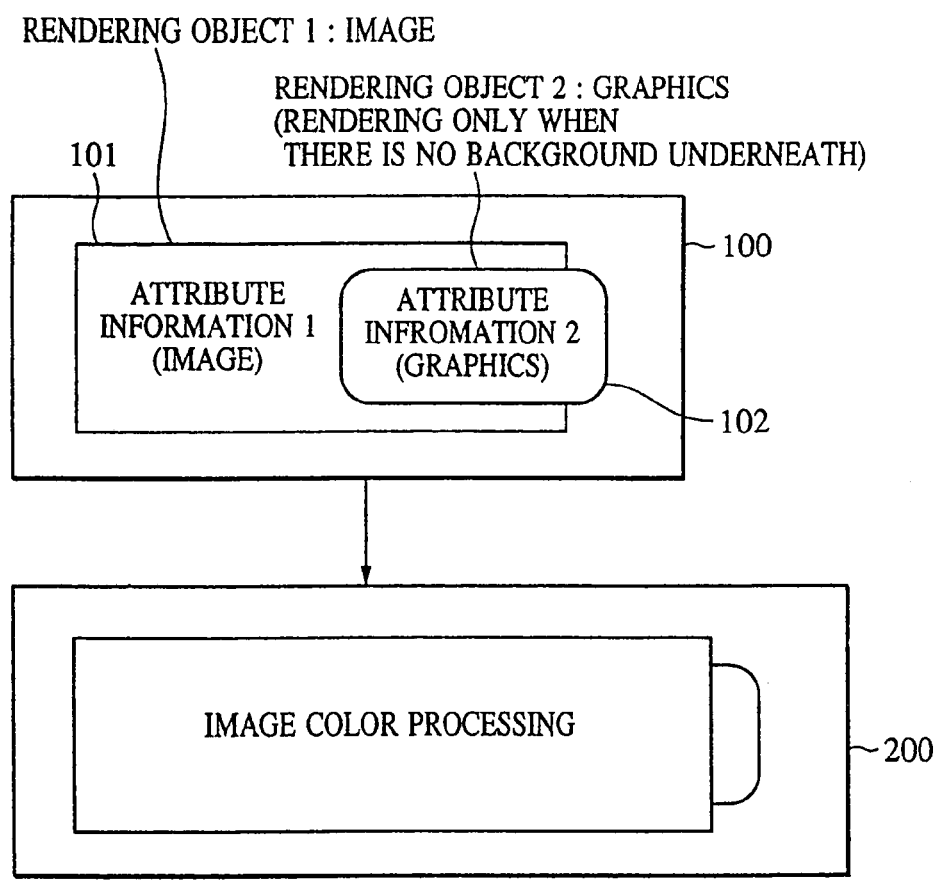
FIG. 14 illustrates an example in which optimal color processing has failed by the use of the attribute-information memory according to the known technique shown in FIG. 13.

The above-described color processing is implemented by forming the processing indicated by the flowcharts of FIGS. 11A and 11B into a program and by executing this program. The overall printing processing of this embodiment is described in detail with reference to the flowcharts of FIGS. 11A and 11B.

Upon receiving a print execution command from the input device 4, the OS 20 loaded, together with the driver 22 and the application 21, from the auxiliary storage device 3 into the main storage device 2 receives the corresponding message. The OS 20 then sends the print execution message to the currently active application 21.

The application 21 then converts the print execution message into a format recognizable by the OS 20, and sends a message including the print data and the command to the OS 20. Then, the OS 20 converts the message into a command recognizable by the driver 22, and sends it to the driver 22. In the driver 22, the processing indicated by the flowcharts shown in FIGS. 11A and 11B is executed.

In step S101, upon receiving an initializing message from the OS 20, the driver 22 allocates the multi-level bit-map area 230 and the attribute-information storage area 231 shown in FIG. 3, and then clears the content in the storage areas 230 and 231.

Then, in step S102, the driver 22 expands a multi-level bit map according to the rendering command sent from OS 20, and stores the expanded multi-level bit map in the multi-level bit-map area 230. In step S103, the driver 22 also stores the attributes of the rendering command in the attribute-information storage area 231 as the attribute information.

The attribute-information storage processing in step S103 is discussed below in detail with reference to FIG. 11B.

The main feature of this embodiment is to store the attribute information of a rendering command in the attribute-information storage area 231. Thus, in step S201, the type of attribute of the rendering command is determined. It is then determined in step S202 whether the rendering command pattern is white. If so, the process proceeds to step S203. In step S203, a suitable portion of the logical operation code designated for the rendering command is extracted, and the operation (Target_SrcON/Target_SrcOFF) for the attribute (target attribute bit) is created, as described with reference to FIGS. 7A through 7D. If it is found in step S202 that the rendering command pattern is a color other than white, the process proceeds to step S204. In step S204, the operation (Target_SrcON/Target_SrcOFF) for the target attribute bit is created, as in step S203. That is, in step S203 or S204, the operation to be performed when storing the rendering command attribute in the attribute-information storage area 231 is created, as shown in FIG. 7B.

If logical operation processing is not specified for the rendering command, the corresponding operation is created, assuming that the logical operation code is set as simple overwrite processing.

Subsequently, in step S205, the operation (NonTarget_SrcON/NonTarget_SrcOFF) for the attributes other than the attribute of the rendering command (non-target attribute bits) is created, as shown in FIG. 7D, based on the operation for the rendering command attribute created in step S203 or S204.

By performing the operations created as described-above on all the bits of the attribute information individually, precise attribute information can be created. In this embodiment, operation processing can be performed simultaneously regardless of the content of the individual bits of the attribute information, as described with reference to FIGS. 8A through 8C, thereby making the processing more efficient.

Then, in step S206, the logical operation code for the attribute information is created, as shown in FIGS. 8B and 8C, based on the operations created in steps S203 or S204, and S205.

In step S207, the attribute information source is created based on the rendering object, as shown in FIG. 7C. Subsequently, in step S208, the attribute information pattern is created, as shown in FIG. 8A, in the format in which the bit indicating the attribute of the rendering command is turned on and the other bits are turned off by using the attribute information format shown in FIG. 4. In step S209, the regions corresponding to the individual pixels in the multi-level bit map in the attribute-information storage area 231 are extracted, and are set as the attribute-information dest.

Then, in step S210, logical operation processing is executed by using the attribute-information logical operation code created in step S209 based on the attribute information source, the attribute information pattern, and the attribute information dest, as shown in FIGS. 8B and 8C. In step S211, the obtained operation result is stored in the attribute information dest.

By the processing of steps S201 through S211, the attribute-information storage processing in step S103 is completed, and the process returns to step S104 of FIG. 11A.

A determination is made in step S104 as to whether the expansion of the multi-level bit map and the storage of the corresponding attribute information have been completed for all the rendering commands. If the result of step S104 is yes, the process proceeds to step S105. In step S105, the inversion attribute of the attribute information is converted as shown in FIG. 9, for the inversion bits in the attribute-information storage area 231. As a result, precise attribute information is generated. If the result of step S104 is no, the process returns to step S102.

In step S106, a multi-level bit map is extracted for each attribute according to the attribute information. In step S107, color processing optimal for the attribute is then performed. Then, in step S108, the device-dependent bit map 232 is created, as shown in FIG. 10.

By performing the processing in steps S106 through S108, the device-dependent bit maps 232 created for the individual attributes are combined. It is thus possible to obtain an optimal output result regardless of the type of logical operation processing designated for the rendering command. It is determined in step S109 whether all the attributes have been processed.

Then, in step S110, the combined device-dependent bit map is transferred to the printer 7. The printing processing in this embodiment is then completed.

Any type of printer 7 in this embodiment may be used as long as it is able to output the device-dependent bit maps. The printer 7 may be a binding printer or a non-binding printer.

In this embodiment, the rendering command possesses three types of attributes, i.e., image, text, and graphics. However, by adding the number of bits of the attribute information shown in FIG. 4, the number of attributes to be handled may be increased or decreased.

As described above, according to this embodiment, it is possible to store precise attribute information for all the pixels including a rendering object which requires logical operation processing. As a consequence, optimal color processing for each pixel can be performed, thereby obtaining a high quality output result.

In this embodiment, a rendering object is expanded into a multi-level bit map. However, any type of format may be employed as long as it represents color information of pixels. For example, when binary data is used, the present invention is still applicable.

The present invention is applicable to a single device (for example, a copying machine or a facsimile machine) or a system consisting of a plurality of devices (for example, a combination of a host computer, an interface, a reader, and a printer).

The object of the present invention can also be achieved by the following modification. A storage medium (or a recording medium) for storing software program code implementing the functions of the above-described embodiment may be supplied to a system or an apparatus. Then, a computer (or a CPU or an micro processing unit (MPU)) of the system or the apparatus may read and execute the program code from the storage medium (recording medium). In this case, the program code itself read from the storage medium implements the novel functions of the embodiment. Accordingly, the program code itself, and the storage medium storing such program code constitute the present invention.

The functions of the above-described embodiment may be implemented not only by running the read program code on the computer, but also by wholly or partially executing the processing by an OS running on the computer or in cooperation with other application software based on the instructions of the program code. The present invention also encompasses such a modification.

The functions of the embodiment may also be implemented by the following modification. The program code read from the storage medium is written into a memory provided on a feature expansion board inserted into the computer or a feature expansion unit connected to the computer. Then, a CPU provided for the feature expansion board or the feature expansion unit partially or wholly executes processing based on the instructions of the program code.

While the present invention has been described with reference to what are presently considered to be the preferred embodiment, it is to be understood that the invention is not limited to the disclosed embodiment. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing method for creating bit-map data and attribute information for each pixel formed of at least two object bits each representing different types of objects a given pixel will display and an inversion bit representing an inversion attribute and corresponding to the bit-map data by expanding a rendering command, said image processing method comprising:

an operation determining step of determining the type of operation to be performed on the attribute information based on logical operation processing specified for the rendering command;

a logical operation processing creating step of creating the logical operation processing for the attribute information based on the determined type of operation;

a logical operation processing step of creating the attribute information formed of at least two object bits each representing different types of objects a given pixel will display and an inversion bit representing an inversion attribute by executing the logical operation processing so that the bit pattern represented by the attribute information has all of the bits turned off, has only one object bit turned on, has only one object bit turned off, or has all of the bits turned on; and an inversion step of inverting the attribute information when only one object bit is turned off or when all of the bits are turned on.

2. An image processing method according to claim 1, wherein the attribute information comprises information indicating the attribute and the inversion attribute possessed by the rendering command.

3. An image processing method according to claim 2, wherein each of the attributes and the inversion attribute of the attribute information has one bit.

4. An image processing method according to claim 2, wherein the attribute possessed by the rendering command indicates the type of object.

5. An image processing method according to claim 1, wherein said operation determining step comprises:
   an analysis step of analyzing the logical operation processing specified for the rendering command;
   a target-attribute operation determining step of determining a target-attribute operation corresponding to the attribute possessed by the rendering command based on a result obtained in said analysis step; and
   a non-target-attribute operation determining step of determining a non-target attribute operation corresponding to an attribute other than the attribute possessed by the rendering command based on the target-attribute operation.

6. An image processing method according to claim 5, wherein said target-attribute operation determining step determines the target-attribute operation based on the logical operation processing specified for the rendering command and color information of a pattern on which the logical operation processing is to be performed.

7. An image processing method according to claim 1, wherein, when the logical operation processing is not specified for the rendering command, said operation determining step determines the type of operation to be performed on the attribute information by assuming that the logical operation processing indicates an overwriting operation.

8. An image processing method according to claim 1, further comprising a source creating step of creating a source and a pattern for the attribute information based on the rendering command, wherein said logical operation processing step executes the logical operation processing based on the source and the pattern for the attribute information.

9. An image processing method according to claim 8, wherein the attribute information created in said logical operation processing step has a result similar to a result obtained by performing the operation determined in said operation determining step on the source for the attribute information.

10. An image processing method according to claim 1, wherein the bit-map data is multi-level bit-map data.

11. An image processing method according to claim 1, further comprising a color processing step of performing color processing for each pixel of the bit-map data expanded from the rendering command based on the attribute information obtained in said inversion step.

12. An image processing apparatus for creating bit-map data and attribute information for each pixel formed of at least two objects bits each representing different types of objects a given pixel will display an inversion bit representing an inversion attribute and corresponding to the bit-map data by expanding a rendering command, said image processing apparatus comprising:
   operation determining means for determining the type of operation to be performed on the attribute information based on logical operation processing specified for the rendering command;
   logical operation processing creating means for creating the logical operation processing for the attribute information based on the determined type of operation;
   logical operation processing means for creating the attribute information formed of at least two objects bits each representing different types of objects a given pixel will display and an inversion bit representing an inversion attribute by executing the logical operation processing so that the bit pattern represented by the attribute information has all of the bits turned off, has only one object bit turned on, has only one object bit turned off, or has all of the bits turned on;
   inversion means for inverting the attribute information when only one object bit is turned on; and
   color processing means for performing color processing on the bit-map data based on the attribute information.

13. An image processing system comprising an image processing apparatus and an image forming apparatus connected to each other,
   said image processing apparatus comprising:
   bit-map creating means for creating bit-map data by expanding a rendering command;
   attribute-information creating means for creating attribute information for each pixel formed of at least two object bits each representing different types of objects a given pixel will display and an inversion bit representing an inversion attribute and corresponding to the bit-map data;
   color processing means for performing color processing on the bit-map data based on the attribute information; and
   output means for outputting the color-processed bit-map data to said image forming apparatus,
   said attribute-information creating means comprising:
   operation determining means for determining the type of operation to be performed on the attribute information based on logical operation processing specified for the rendering command;
   logical operation processing creating means for creating the logical operation processing for the attribute information based on the determined type of operation;
   logical operation processing means for creating the attribute information formed of at least two object bits each representing different types of objects a given pixel will display and an inversion bit representing an inversion attribute by executing the logical operation processing so that the bit pattern represented by the attribute information has all of the bits turned off, has only one object bit turned on, has only one object bit turned off, or has all of the bits turned on; and
   inversion means for inverting the attribute information when only one object bit is turned off or when all of the bits are turned on.

14. A control program embodied in a computer-readable medium for performing image processing for creating bit-map data and attribute information for each pixel formed of at least two object bits each representing different types of objects a given pixel will display and an inversion bit representing an inversion attribute and corresponding to the bit-map data by expanding a rendering command, said control program comprising:
   an operation determining step code for determining the type of operation to be performed on the attribute information based on logical operation processing specified for the rendering command;

a logical operation processing creating step code for creating the logical operation processing for the attribute information based on the determined type of operation;

a logical operation processing step code for creating the attribute information formed of at least two object bits each representing different types of objects a given pixel will display and an inversion bit representing an inversion attribute by executing the logical operation processing so that the bit pattern represented by the attribute information has all of the bits turned off, has only one object bit turned on, has only one object bit turned off, or has all of the bits turned on; and an inversion step code for inverting the attribute information when only one object bit is turned off or when all of the bits are turned on.

15. A computer-readable recording medium in which the control program set forth in claim 14 is embodied.

* * * * *

UNITED STATES PATENT AND TRADEMARK OFFICE
CERTIFICATE OF CORRECTION

PATENT NO. : 7,113,309 B2 Page 1 of 1
APPLICATION NO. : 10/098546
DATED : September 26, 2006
INVENTOR(S) : Tomoyuki Furuya It is certified that error appears in the above-identified patent and that said Letters Patent is hereby corrected as shown below:

COLUMN 6:

Line 1, " "dest"))" should read --"dest")--.
    Line 3, " "result"))" should read --"result")--.
    Line 26, "operation"))" should read --operation")--.

COLUMN 7:

Line 1, "dest operation" should read --dest→operation--.
    Line 2, "sion). One" should read --sion).-- and "¶ One" should read --One--.

COLUMN 13:

Line 59, "objects" should read --object--.
    Line 60, "display an" should read --display and an--.

COLUMN 14:

Line 5, "objects" should read --object--.

Signed and Sealed this

Fifteenth Day of April, 2008

JON W. DUDAS
*Director of the United States Patent and Trademark Office*